United States Patent
Naujok et al.

(10) Patent No.: US 7,726,581 B2
(45) Date of Patent: Jun. 1, 2010

(54) HVAC CONTROLLER

(75) Inventors: Christopher Naujok, Hudson, WI (US); Rachael Tix, Hastings, MN (US); Janis Skujins, Minneapolis, MN (US); Kyle Gudmunson, Richfield, MN (US); Bradley Lohrding, Edina, MN (US); Brett R. Johnson, Roseville, MN (US); Bruce Frohman, Saint Louis Park, MN (US); Shaohui Oiu, Shoreview, MN (US); Micah Somers, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1039 days.

(21) Appl. No.: 11/306,841

(22) Filed: Jan. 12, 2006

(65) Prior Publication Data

US 2007/0158444 A1    Jul. 12, 2007

(51) Int. Cl.
*F24F 11/053* (2006.01)
*G05D 23/12* (2006.01)
*G05D 23/00* (2006.01)

(52) U.S. Cl. ......................... 236/1 C; 236/94
(58) Field of Classification Search ............... 236/1 C, 236/94; 62/126, 129
See application file for complete search history.

(56) References Cited

U.S. PATENT DOCUMENTS

| 2,225,080 | A | 12/1940 | Newman |
| D136,848 | S | 12/1943 | Dreyfuss |
| D136,850 | S | 12/1943 | Dreyfuss |
| D136,852 | S | 12/1943 | Dreyfuss |
| 2,394,920 | A | 2/1946 | Kronmiller |
| D176,657 | S | 1/1956 | Dreyfuss |
| 2,729,719 | A * | 1/1956 | Kronmiller ............... 337/352 |
| D179,069 | S | 10/1956 | Dreyfuss |
| D180,517 | S | 6/1957 | Hose |
| D183,121 | S | 7/1958 | Dreyfuss |
| D183,164 | S | 7/1958 | Dreyfuss |
| 2,847,539 | A * | 8/1958 | Green et al. ................ 337/3 |
| D189,368 | S | 11/1960 | Baak |
| D190,050 | S | 4/1961 | Duncan |
| D197,352 | S | 1/1964 | Dreyfuss |
| 3,190,988 | A * | 6/1965 | Graham et al. ............ 337/366 |
| 3,367,573 | A * | 2/1968 | Smith ........................ 236/87 |
| 3,599,006 | A | 8/1971 | Harris |
| 4,079,366 | A | 3/1978 | Wong |

(Continued)

OTHER PUBLICATIONS

Warmly Yours, "Model TH111GFCI-P (120 VAC)," Manual, pp. 1-4, printed prior to Mar. 1, 2004.

(Continued)

*Primary Examiner*—Chen-Wen Jiang
(74) *Attorney, Agent, or Firm*—Crompton Seager & Tufte LLC

(57) ABSTRACT

An HVAC controller may include an upper housing having a front and a back, the back including a center. A lens dial including an engagement portion may be rotatably secured relative to the upper housing. A set point operator may include a first portion that is disposed about the upper housing center as well as a second portion that is adapted to interact with the lens dial engagement portion. A mechanical movement to electrical signal converter such as a potentiometer may be disposed within the HVAC controller such that the first portion of the set point operator communicates with the potentiometer.

21 Claims, 4 Drawing Sheets

U.S. PATENT DOCUMENTS

| | | | |
|---|---|---|---|
| D248,838 S | 8/1978 | Pasquarette et al. | |
| 4,174,807 A | 11/1979 | Smith et al. | |
| D254,052 S | 1/1980 | Wolfe | |
| 4,206,872 A | 6/1980 | Levine | |
| 4,223,291 A | 9/1980 | Teichert | |
| 4,252,270 A | 2/1981 | Taylor et al. | |
| 4,264,034 A | 4/1981 | Hyltin et al. | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,350,966 A | 9/1982 | Nelson | |
| 4,382,544 A | 5/1983 | Stewart | |
| 4,386,649 A | 6/1983 | Hines et al. | |
| 4,388,692 A | 6/1983 | Jones et al. | |
| 4,390,859 A * | 6/1983 | Kasprzyk et al. | 338/25 |
| 4,414,520 A | 11/1983 | Ruuth | |
| 4,420,736 A | 12/1983 | Krueger | |
| 4,431,134 A | 2/1984 | Hendricks et al. | |
| 4,442,972 A | 4/1984 | Sahay et al. | |
| 4,446,913 A | 5/1984 | Krocker | |
| 4,449,832 A | 5/1984 | Kammerer | |
| 4,479,604 A | 10/1984 | Didner | |
| D276,731 S | 12/1984 | Steiner | |
| 4,606,401 A | 8/1986 | Levine et al. | |
| 4,621,336 A | 11/1986 | Brown | |
| D288,670 S | 3/1987 | Steiner | |
| 4,646,964 A | 3/1987 | Parker et al. | |
| 4,653,708 A | 3/1987 | Rich | |
| 4,667,068 A * | 5/1987 | Cummings | 200/61.86 |
| D290,235 S | 6/1987 | Odom, Jr. et al. | |
| 4,669,654 A | 6/1987 | Levine et al. | |
| 4,685,614 A | 8/1987 | Levine | |
| 4,717,333 A | 1/1988 | Carignan | |
| 4,725,001 A | 2/1988 | Carney et al. | |
| 4,730,110 A | 3/1988 | Spaulding | |
| 4,751,961 A * | 6/1988 | Levine et al. | 165/238 |
| 4,837,731 A | 6/1989 | Levine et al. | |
| 4,846,400 A | 7/1989 | Crouse | |
| 4,881,686 A | 11/1989 | Mehta | |
| 4,910,503 A | 3/1990 | Brodsky | |
| 4,912,939 A | 4/1990 | Obermann et al. | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,005,365 A | 4/1991 | Lynch | |
| 5,012,973 A | 5/1991 | Dick et al. | |
| 5,038,851 A | 8/1991 | Mehta | |
| 5,065,813 A | 11/1991 | Berkeley et al. | |
| 5,088,645 A | 2/1992 | Bell | |
| 5,107,918 A | 4/1992 | McFarlane et al. | |
| 5,148,979 A | 9/1992 | Brueton | |
| 5,154,226 A | 10/1992 | Porter et al. | |
| 5,161,606 A | 11/1992 | Berkeley et al. | |
| 5,181,653 A | 1/1993 | Foster et al. | |
| 5,194,842 A | 3/1993 | Lau et al. | |
| 5,211,332 A | 5/1993 | Adams | |
| 5,230,482 A | 7/1993 | Ratz et al. | |
| 5,246,649 A | 9/1993 | Mattei et al. | |
| 5,251,813 A | 10/1993 | Kniepkamp | |
| 5,259,445 A | 11/1993 | Pratt et al. | |
| 5,303,612 A | 4/1994 | Odom et al. | |
| D347,584 S | 6/1994 | Vogelpohl | |
| 5,329,991 A | 7/1994 | Mehta et al. | |
| 5,348,078 A | 9/1994 | Dushane et al. | |
| 5,482,209 A | 1/1996 | Cochran et al. | |
| 5,526,422 A | 6/1996 | Keen | |
| 5,537,106 A | 7/1996 | Mitsuhashi | |
| 5,542,279 A | 8/1996 | Erdman et al. | |
| 5,566,879 A | 10/1996 | Longtin | |
| 5,570,837 A | 11/1996 | Brown et al. | |
| 5,573,850 A | 11/1996 | Cunningham et al. | |
| 5,673,850 A | 10/1997 | Uptegraph | |
| D390,482 S | 2/1998 | Pasquarette | |
| 5,718,121 A | 2/1998 | Edwards et al. | |
| 5,771,594 A | 6/1998 | Feichtinger | |
| 5,782,296 A | 7/1998 | Mehta | |
| 5,816,491 A | 10/1998 | Berkeley et al. | |
| 5,873,519 A | 2/1999 | Beilfuss | |
| 5,901,183 A | 5/1999 | Garin et al. | |
| 5,902,183 A | 5/1999 | DSouza | |
| 5,937,942 A | 8/1999 | Bias et al. | |
| 5,943,917 A | 8/1999 | Truong et al. | |
| 6,032,867 A | 3/2000 | Dushane et al. | |
| 6,196,467 B1 | 3/2001 | Dushane | |
| 6,208,331 B1 | 3/2001 | Singh et al. | |
| 6,315,211 B1 | 11/2001 | Sartain et al. | |
| 6,318,639 B1 | 11/2001 | Toth | |
| 6,351,693 B1 | 2/2002 | Monie et al. | |
| 6,353,429 B1 | 3/2002 | Long | |
| 6,449,533 B1 | 9/2002 | Mueller et al. | |
| 6,502,758 B2 | 1/2003 | Cottrell | |
| 6,518,682 B2 | 2/2003 | Weaver et al. | |
| 6,518,957 B1 | 2/2003 | Lehtinen et al. | |
| 6,525,675 B2 | 2/2003 | Rodi | |
| D471,825 S | 3/2003 | Peabody | |
| 6,542,088 B1 | 4/2003 | Bielski et al. | |
| 6,581,846 B1 | 6/2003 | Rosen | |
| 6,595,430 B1 | 7/2003 | Shah | |
| 6,741,158 B2 | 5/2004 | Engler et al. | |
| 6,927,348 B1 | 8/2005 | Schmidt et al. | |
| 7,159,789 B2 * | 1/2007 | Schwendinger et al. | 236/1 C |
| 7,159,790 B2 * | 1/2007 | Schwendinger et al. | 236/1 C |
| 2002/0005435 A1 | 1/2002 | Cottrell | |
| 2002/0063680 A1 | 5/2002 | Lou et al. | |
| 2002/0078761 A1 | 6/2002 | Meyer | |
| 2002/0145544 A1 | 10/2002 | Rodi | |
| 2002/0148317 A1 | 10/2002 | Onodera | |
| 2003/0034897 A1 | 2/2003 | Shamoon et al. | |
| 2003/0034898 A1 | 2/2003 | Shamoon et al. | |
| 2003/0093907 A1 | 5/2003 | Schroter et al. | |
| 2003/0112157 A1 | 6/2003 | Strasser | |
| 2003/0121652 A1 | 7/2003 | Carey et al. | |
| 2003/0142121 A1 | 7/2003 | Rosen | |
| 2003/0209411 A1 | 11/2003 | McGrath, Jr. et al. | |

OTHER PUBLICATIONS

White-Rodgers, "Installation Instructions for Heating & Air Conditioning IF72 5/2 Day Programmable Heat Pump Thermostat," 8 pages, printed prior to Mar. 1, 2004.

White-Rodgers, "Installation Instructions for Heating & Air Conditioning IF78 5/2 Day Programmable Thermostat," 7 pages, printed prior to Mar. 1, 2004.

White-Rodgers, "Comfort-Set 90 Series Thermostat," Manual, pp. 1-24, printed prior to Mar. 1, 2004.

White-Rodgers, "Comfort-Set III Thermostat," Manual, pp. 1-44, printed prior to Mar. 1, 2004.

White-Rodgers, 1F80-240 "(for Heating Only systems) Programmable Electronic Digital Thermostat," Installation and Operation Instructions, 8 pages, printed prior to Mar. 1, 2004.

White-Rodgers, 1F80-241 "Programmable Electronic Digital Thermostat," Installation and Operation Instructions, 6 pages, printed prior to Mar. 1, 2004.

White-Rodgers, 1F80-261 "Programmable Electronic Digital Thermostat," Installation and Operation Instructions, 8 pages, printed prior to Mar. 1, 2004.

White-Rodgers, 1F81-261 "Programmable Electronic Digital Multi-Stage Thermostat," Installation and Operation Instructions, 8 pages, printed prior to Mar. 1, 2004.

White-Rodgers, 1F82-261 "Programmable Electronic Digital Heat Pump Thermostat," Installation and Operation Instructions, 8 pages, printed prior to Mar. 1, 2004.

www.honeywell.com/yourhome/, "Comfort Energy and Health Solutions," Honeywell website, 2 pages, 2002.
www.icmcontrols.com, Simplecomfort, SC3000 Single Stage Heat/Single Stage Cool or Single Stage Heat Pump/Manual Changeover, 1 page, printed prior to Mar. 1, 2004.
www.icmcontrols.com, Simplecomfort, SC3001 Single Stage Heat/Single Stage Cool or Single Stage Heat Pump/Manual Changeover, 1 page, printed prior to Mar. 1, 2004.
www.icmcontrols.com, Simplecomfort, SC3006 Single Stage Heat/Single Stage Cool or Single Stage Heat Pump/Auto Changeover, 1 page, printed prior to Mar. 1, 2004.
www.icmcontrols.com, Simplecomfort, SC3201 2 Stage Heat Pump Manual Changeover, 1 page, printed prior to Mar. 1, 2004.
www.icmcontrols.com, Simplecomfort, SC3801 2 Stage Heat/2 Stage Cool 2 Stage Heat Pump/Audio Changeover, 1 page, printed prior to Mar. 1, 2004.
Bourns, ECW—"Digital Contacting Encoder," 3 pages, Apr. 2003.
Braeburn, "Model 3000 Digital Heat/Cool Non-Programmable," 2 pages, printed Dec. 9, 2003, http://www.braebouronline.com/model3000.html.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Guide, pp. 1-8 pages, 1999.
Carrier, "Thermidistat Control," Installation, Start-Up, and Operating Instructions, pp. 1-12, Aug. 1999.
Carrier, "Thermostats: Carrier HVAC Parts," 52 pages, printed Oct. 14, 2003, http:///www.carrierhvacparts.com/Merchant2/merchant.mv.
CorAccess, "Companion 6," User Guide, pp. 1-20, Jun. 17, 2002.
Eco-Stat Website, http://www.ecomfg.net, 4 pages, printed Sep. 30, 2003 and Oct. 1, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Honeywell, "T87F Thermostats," pp. 1-8, 2002.
Honeywell, "T8141A Electronic Heat Pump Thermostat," Installation Instructions, 8 pages, 1995.
Honeywell, "T8141A Electronic Heat Pump Thermostats," Product Data, 8 pages, 1996.
Honeywell, "T8200 Microelectronic Fuel Saver Thermostat," Owner's Manual, 23 pages, 1984.
Honeywell, "T8200A Microelectronic Chronotherm Fuel Saver Thermostat," 20 pages, 1986.
Honeywell, "Modulating Room Thermostat," Dutch User's Manual and English translation of the manual, 13 pages each, Mar. 2002.
Honeywell, "Thermostat Subbases Q539A,B,C,F,G,H,J,P," pp. 1-11, 1989.
Hunter, "44200/44250," Owner's Manual, 32 pages, printed prior to Mar. 1, 2004.
Hunter, "44300/44350," Owner's Manual, 35 pages, printed prior to Mar. 1, 2004.
Hunter, "Auto Saver 550", Owner's Manual Model 44550, 44 pages, printed prior to Mar. 1, 2004.
Invensys, "9700i 9701i 9715i 9720i Deluxe Programmable Thermostats," User's Manual, pp. 1-28, printed prior to Mar. 1, 2004.
Lux, "511 Series Smart Temp Electronic Thermostat," Owner's Manual, 3 pages, printed prior to Mar. 1, 2004.
Lux, "600 Series Smart Temp Electronic Thermostat," Owner's Manual, 3 pages, printed prior to Mar. 1, 2004.
Lux, "602 Series Multi-Stage Programmable Thermostat," Owner's Manual, 2 pages, printed prior to Mar. 1, 2004.
Lux, "605/2110 Series Programmable Heat Pump Thermostat," Owner's Manual, 3 pages, printed prior to Mar. 1, 2004.
Lux, "700/9000 Series Smart Temp Electronic Thermostat," Owner's Manual, 3 pages, printed prior to Mar. 1, 2004.
Lux, "PSPH521 Series Programmable Heat Pump Thermostat," Owner's Manual, 3 pages, printed prior to Mar. 1, 2004.
Lux, "TX500: Smart Temp 500," http://wwwww.luxproducts.com/thermostats/tx500.htm., 2 pages, printed Dec. 9, 2003.
Lux, "TX500 Series Smart Temp Electronic Thermostat," Owner's Manual, 3 pages, printed prior to Mar. 1, 2004.
Lux, "TX1500 Series Smart Temp Electronic Thermostat," Owner's Manual, 6 pages, printed prior to Mar. 1, 2004.
Lux, "ELV1 Programmable Line Voltage Thermostat," Owner's Manual, 3 pages, printed prior to Mar. 1, 2004.
Metasys, "HVAC Pro for Windows User's Manual," 308 pages, 1998.
Millier, "Using Rotary Encoders as Input Devices," Circuit Cellular, Issue 152, 6 pages, Mar. 2003.
RE16 Series Mechanical Incremental Rotary Encoder, 3 pages, prior to Mar. 1, 2004.
http://www.ritetemp.info/rtMenu_13.html, Rite Temp 8082, 6 pages, printed Jun. 20, 2003.
Ritetemp, "Install Guide 8095," 7 pages, prior to Jun. 22, 2004.
Ritetemp, "Install Guide 8099," 8 pages, prior to Jun. 22, 2004.
Ritetemp, "The RiteTemp Support Site—8099 Technical Support Page," 1 page, printed Oct. 14, 2003, http:///www.ritetemp-thermostats.com/8099.html.
Ritetemp, "The RiteTemp Supprt Site—What Thermostat," 1 page, printed Oct. 14, 2003, http://www.ritetemp-thermostats.com/What_Thermostat.html.
Totaline, "1 for All programmable Digital Thermostat," Owner's Manual P/N P374-1100FM, 24 pages, Nov. 1998.
Totaline, "1 for All programmable Digital Thermostat," Owner's Manual P/N P374-1100, 24 pages, Apr. 2001.
Totaline, "Programmable Thermostat Configurable for Advanced Heat Pump or Dual Fuel Operation," Owner's Manual P/N P374-1500, 24 pages, Jun. 1999.
Totaline, "Intellistat Combination Temperature and Humidity Control," Owner's Manual P/N P374-1600, 26 pages, Jun. 2001.
Totaline, "Instructions P/N P474-1010", Manual, 2 pages, Dec. 1998.
Totaline, "1 for All Programmable Digital Thermostat," Owner's Manual P/N P474-1050, 22 pages, Nov. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.

* cited by examiner

HVAC CONTROLLER

TECHNICAL FIELD

The present invention relates generally to HVAC systems and more particularly to HVAC controllers such as thermostats.

BACKGROUND

HVAC controllers are used widely in dwellings, buildings, and other controlled spaces. In many cases, the HVAC controllers are mounted on a wall or the like to allow for the measurement and control of the temperature, humidity and/or other environmental parameter within the space. HVAC controllers come in a variety of shapes and with a variety of functions. Advanced HVAC controllers have built in electronics, often with solid state sensors, to sense and control various environmental parameters within a space. The user interface of some electronic HVAC controllers includes software controlled buttons and a display.

HVAC controllers often utilize a large number of individual parts, which may complicate the assembly process of the controller. Moreover, it may be expensive to fabricate each part and then assemble a large number of components to form a controller. Therefore, a need remains for improved HVAC controllers.

SUMMARY

The present invention is directed to an improved HVAC controller. In some instances, an improved HVAC controller may have a simpler design and may employ fewer parts in comparison to previous HVAC controllers.

Accordingly, an example embodiment of the invention may be found in an HVAC controller that has an upper housing having a front and a back, the back including a center. A lens dial may be rotatably secured to the upper housing. The lens dial may include an engagement portion that is positioned extending through an opening in the upper housing toward the back of the upper housing. A set point operator may include a first portion that is disposed about the upper housing center as well as a second portion that is adapted to interact with the lens dial engagement portion. A mechanical movement to electrical signal converter may be disposed within the HVAC controller such that the first portion of the set point operator communicates with the mechanical movement to electrical signal converter.

In some instances, the upper housing may include one or more retention clips that rotatably secure the lens dial to the upper housing. The one or more retention clips may, if desired, interact with a lens dial periphery. The first portion of the set point operator may, in some cases, include an annular or semi-annular portion that is adapted to fit about the upper housing center and a shaft portion that is adapted to interact with the mechanical movement to electrical signal converter. The upper housing center may include an annular or semi-annular ring about which the annular or semi-annular portion of the set point operator may rotate.

The lens dial may include a set point indicator that is disposed on the lens dial, but this is not necessary. In certain instances, the lens dial and the set point indicator may be integrally molded or otherwise formed as a single part. In some instances, a scale plate may be disposed between the upper housing and the lens dial. The scale plate may be secured to the upper housing.

An HVAC controller may further include a current temperature thermometer that includes a current temperature indicator. In some instances, the scale plate may include a set point temperature scale, a current temperature scale and a center portion that is configured to permit the current temperature indicator to extend over the current temperature scale. The center portion may, in some instances, be raised in order to accommodate the current temperature thermometer therein.

Another example embodiment of the present invention may be found in a thermostat that includes a housing and a lens dial rotatably secured to the housing. In some instances, the lens dial is snap fitted onto the housing. The thermostat also includes a circuit board that is adapted to control HVAC equipment and that includes a centrally located mechanical movement to electrical signal converter. The thermostat includes structure adapted to convert movement at the lens dial periphery into movement at the centrally located mechanical movement to electrical signal converter.

In some instances, the structure adapted to convert movement may include or be a set point operator that has a first end that is adapted to interact with a periphery of the lens dial and a second, opposing, end that is adapted to interact with the centrally located mechanical movement to electrical signal converter. The lens dial may, if desired, include a set point indicator disposed on the lens dial, but this is not necessary. The lens dial and the set point indicator may be integrally molded or otherwise formed as a single part.

In some instances, the thermostat may include a scale plate that can be secured to the housing and disposed under the lens dial. The thermostat may also include a current temperature thermometer that includes a current temperature indicator. In some cases, the scale plate may include a set point temperature scale, a current temperature scale and a center portion that is configured to permit the current temperature indicator to extend over the current temperature scale. If desired, the center portion may be raised in order to accommodate the current temperature thermometer therein.

Another example embodiment of the present invention may be found in a thermostat that includes a dial that is adapted to be rotated to choose a temperature set point and a circuit board including a centrally located potentiometer. A set point operator may include a first end that is adapted to interact with a periphery of the dial and a second end that is adapted to interact with the centrally located potentiometer such that rotational movement at the dial periphery is translated to the centrally located potentiometer.

Another example embodiment of the invention may be found in a thermostat that includes an upper housing and a lens dial that is rotatably secured relative to an outer surface of the upper housing. A scale plate may be disposed between the upper housing and the lens dial.

Another example embodiment of the invention may be found in a thermostat that includes a housing and a lens dial secured relative to the housing. An integrated scale plate may be disposed between the housing and the lens dial, and may be secured to the housing. The integrated scale plate combines, in a single part, a temperature scale and a center portion adapted to accommodate a thermometer disposed under the center portion.

Another example embodiment of the invention may be found in a thermostat that includes a housing and an integrated lens dial that is secured relative to the housing. The lens dial may combine, in a single part, a lens, a dial and a set point indicator, although this is not necessary.

Another example embodiment of the invention may be found in a thermostat that includes a scale, a thermometer, a lens dial and an upper housing. The upper housing may combine, in a single part, a scale support, a thermometer support and a lens dial support, although this is not necessary.

The above summary of the present invention is not intended to describe each disclosed embodiment or every implementation of the present invention. The Figures, Detailed Description and Examples which follow more particularly exemplify these and other embodiments.

BRIEF DESCRIPTION OF THE DRAWINGS

The invention may be more completely understood in consideration of the following detailed description of various embodiments of the invention in connection with the accompanying drawings, in which.

Figure 1:
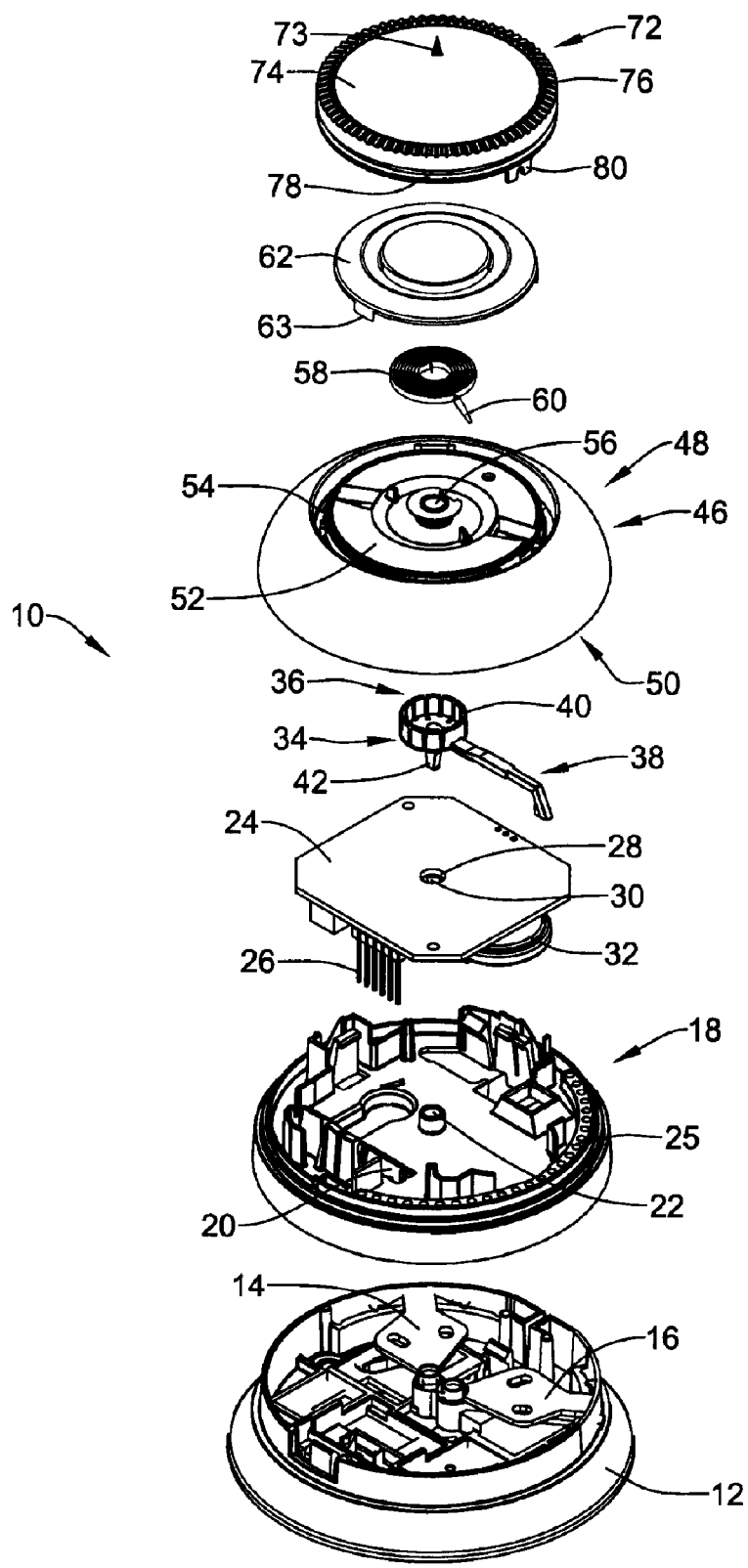
FIG. 1 is a perspective exploded view of an illustrative HVAC controller in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a perspective exploded view of an illustrative controller 10, which in the embodiment shown, includes a sub base 12 that may be configured to be mounted on a surface such as a wall or any other suitable building surface by any suitable fastening means such as, for example, screws, nails, adhesive, etc. As illustrated, sub base 12 has a circular shape, however this is not necessary, as sub base 12 may have any desired geometric shape. The shape of sub base 12, and hence controller 10, is merely ornamental. In an illustrative embodiment, sub base 12 may have a diameter in the range of 8 cm to 12 cm.

Controller 10 may be configured for use with a variety of different HVAC equipment, including but not limited to forced air furnaces, hot water boilers, heat pumps, air conditioning equipment and the like. Consequently, sub base 12 may include switches, connections and the like not shown in the illustrative embodiment. Alternatively, sub base 12 may not include all of the illustrated features. As known in the art, examples of switches and connections that may or may not be included with sub base 12 include a fuel switch, that can be used to select a fuel source such as fuel (natural gas, propane, heating oil and the like) or electric. Sub base 12 may include electrical connections to one or more HVAC equipment such as those mentioned above.

As shown in FIG. 1, sub base 12 includes a SYSTEM lever 14 and a FAN lever 16. In an illustrative embodiment, system lever 14 may be set to OFF, COOL or HEAT. It should be noted that if, for example, controller 10 is being used to control a system lacking air conditioning, SYSTEM lever 14 may only have OFF and HEAT as settings. Conversely, if controller 10 is being used to control a system lacking heat, SYSTEM lever 14 may only have OFF and COOL settings.

In an illustrative embodiment, FAN lever 16 may be set to FAN ON or to AUTOMATIC. If FAN lever 16 is set to FAN ON, such as may be done if the HVAC equipment includes an air exchanger, controller 10 will instruct the blower motor (such as in a forced air furnace) to run continuously. If FAN lever 16 is set to AUTOMATIC, and if the HVAC equipment includes a forced air furnace, for example, the blower motor will be turned on and off commensurate when either the heat or the air conditioning is running. In some cases, such as for heating, the blower motor may turn on a predetermined amount of time before the burner ignites, and may not shut off until a set amount of time after the burner is shut off, in order to reduce issues with temperature extremes within the heat exchanger. FAN OFF, FAN CIRCULATE and other fan modes may also be provided if desired.

Controller 10 may include a lower assembly 18. In some instances, lower assembly 18 may simply be snap fitted onto sub base 12. Lower assembly 18 includes a region 20 (not clearly seen in FIG. 1) that permits electrical communication through lower assembly 18 to sub base 12. Lower assembly 18 also includes a pivot point 22 that is centrally located in lower assembly 18 and that provides a pivot point for a set point operator, to be discussed subsequently. A series of holes 25 may be formed within lower assembly 18 to accommodate a range stop. If desired, pins or screws may be inserted into one or more holes within series of holes 25 in order to limit travel of the set point operator 34. These pins or screws are not illustrated. Lower assembly 18 may be molded as a single part.

Controller 10 may include a printed circuit board 24. As will be discussed subsequently, printed circuit board 24 may be adapted to convert mechanical settings into electrical commands that are communicated to the appropriate HVAC equipment. In some instances, printed circuit board 24 may simply snap into lower assembly 18, thereby eliminating a need for additional fasteners.

Printed circuit board 24 includes several electrical conductors 26 that are adapted to extend through region 20 of lower assembly 18 and into sub base 12 in order to provide electrical communication therebetween. An aperture 28 may be provided to permit access to a potentiometer 30 or the like as will be discussed subsequently. Potentiometer is better seen in FIG. 4. While a potentiometer 30 is shown, it is contemplated that any suitable mechanical movement to electrical signal converter may be used including, for example, an optical, magnetic or other suitable mechanism. As illustrated, printed circuit board 24 includes a battery 32, but this is not required as in some circumstances controller 10 may be powered by the HVAC equipment it controls, or even by household current.

Set point operator 34 includes a first portion 36 and a second portion 38. First portion 36 may be adapted to interact with a center portion of the upper housing, as will be discussed subsequently, while second portion 38 may be adapted to interact with a portion of the lens dial, and sometimes with pins or screws provided in range stop 25. First portion 36 may, as illustrated, include an annular or other shaped portion 40 and a shaft portion 42. It can be seen that shaft portion 42 may extend through aperture 28 (in printed circuit board 24) and hence through potentiometer 30. In some instances, shaft portion 42 has a length sufficient to extend into pivot point 22 positioned within lower assembly 18.

Figure 3:
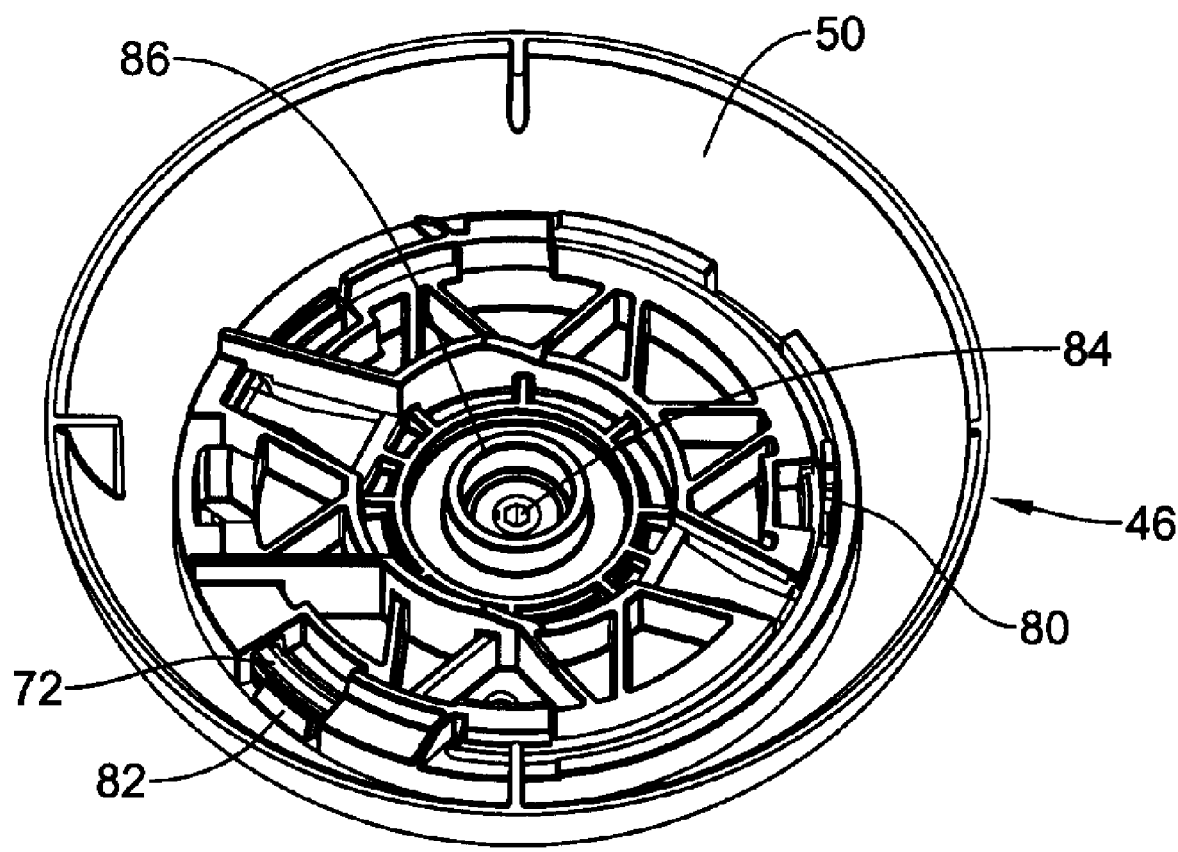
FIG. 3 is a back perspective view of an illustrative upper housing for use with the HVAC controller of FIG. 1, in accordance with an embodiment of the present invention.

Controller 10 also includes an upper housing 46 having a front 48 (FIG. 1) and a back 50 (FIG. 3). In some instances, upper housing 46 may be configured such that it may simply be snap fitted onto lower assembly 18, thereby enclosing printed circuit board 24 and set point operator 34. Upper housing 46 may include a portion 52 of front 48 that is adapted to accommodate a scale plate, as well as an opening 54 that is adapted to accommodate a lens dial, as will be discussed subsequently. Opening 54 may be semi-circular, or partially annular, in shape. Upper housing 46 may be integrally molded or otherwise formed as a single part, but this is not required. Upper housing 46 may be configured to be snap fitted onto lower assembly 18, thereby eliminating or reducing the need for additional parts or fasteners.

Upper housing 46 includes a thermometer mount 56 that is configured to accept a thermometer 58. In some instances, thermometer 58 provides an indication of a current temperature, and thus thermometer 58 may include a current temperature indicator 60. Thermometer 58 may be any suitable thermometer capable of providing an indication of current temperature. In some embodiments, such as that illustrated, thermometer 58 may be a bimetal coil thermometer.

A scale plate 62 may be disposed above upper housing 46. In some instances, scale plate 62 (which is better illustrated in FIG. 2) may include tabs 63, and may be held in place by bending tabs 63 over onto portion 52 of upper housing 46. It is contemplated that in some instances, scale plate 62 may be snap fitted onto portion 52 of front 48 of upper housing 46. In some instances, scale plate 62 may be stamped or otherwise formed from aluminum as a single part, thereby eliminating additional fasteners that may otherwise be necessary. Other materials may also be used, if desired.

Figure 2:
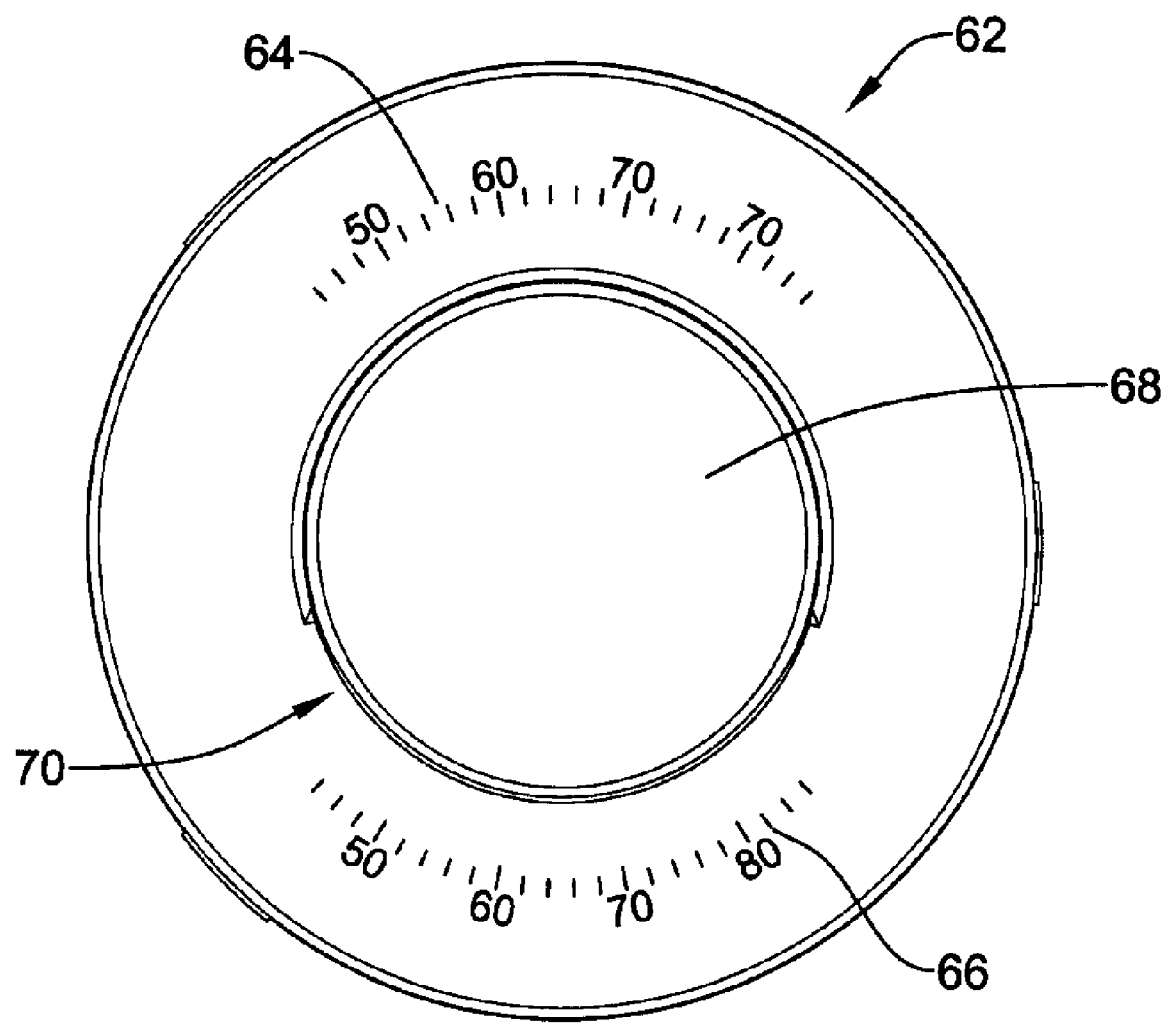
FIG. 2 is a front view of an illustrative scale plate for use with the HVAC controller of FIG. 1, in accordance with an embodiment of the present invention.

Turning briefly to FIG. 2, it can be seen that scale plate 62 may, if desired, include a set point temperature scale 64, a current temperature scale 66 and a center portion 68. Center portion 68 may, as illustrated, be configured to permit current temperature indicator 60 (not shown in FIG. 2) to extend over current temperature scale 66, and in this regard scale plate 62 may include an aperture 70. In some instances, center portion 68 may be raised in order to accommodate current temperature thermometer 58 underneath scale plate 62.

In some instances, set point temperature scale 64 and current temperature scale 66 may be imprinted directly or otherwise provided onto scale plate 62. In some instances, scale plate 62 may have a film disposed thereover. The film may include set point temperature scale 64 and current temperature scale 66. Moreover, any monogram disposed or otherwise displayed on center portion 68 may also be embossed or imprinted onto or into the film. A monogram, if present, may include a company name, or perhaps an indication of which HVAC equipment is controlled by controller 10.

Returning now to FIG. 1, controller 10 may include a lens dial 72. Lens dial 72 may include a lens portion 74 that is transparent or semi-transparent to visible light, such that scale plate 62 may be viewed through lens portion 74. Lens dial 72 may include a set point indicator 73 configured to overlay set point temperature scale 64 of scale plate 62. In some instances, set point indicator 73 may be integrally formed with lens dial 72. In some cases, lens dial 72 may include a textured portion 76 that permits a user to more easily grasp and turn lens dial 72. Lens dial 72 may include a portion 78 that can, in some instances, fit down into opening 54 of upper housing 46. Portion 78 may, in some instances, be circular or semi-circular in shape.

Lens dial 72 may also include an engagement portion 80 that is configured to interact with second portion 38 of set point operator 34 through opening 54. In some instances, engagement portion 80 may be positioned at or near an outer edge, or periphery, of lens dial 72. In some cases, it is contemplated that engagement portion 80 may be positioned inward from an outer edge of lens dial 72, but away from the center of lens dial 72. Lens dial 72 may be a unitary piece, with lens portion 74, textured portion 76, annular portion 78 and engagement portion 80 integrally molded or otherwise formed all together as a single piece.

Figure 4:
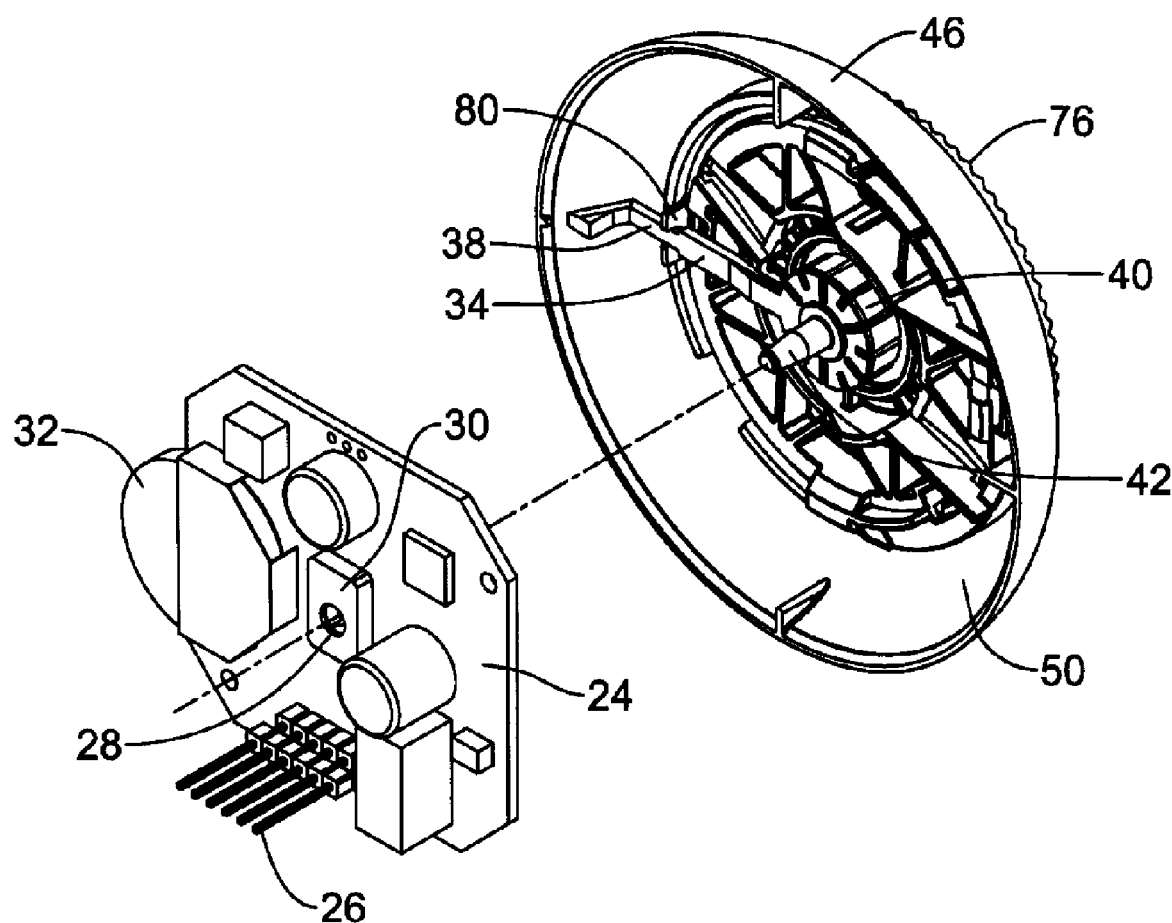
FIG. 4 is a view of the upper housing of FIG. 3, showing the inclusion of a set point operator and a circuit board in accordance with an embodiment of the present invention.

FIGS. 3 and 4 better show the interaction between lens dial 72, upper housing 46 and set point operator 34. In FIG. 3, back 50 of upper housing 46 is illustrated. Back 50 of upper housing 46 includes a retention clip 82 that is configured to permit lens dial 72 to be snap fitted into upper housing 46, and to then retain lens dial 72 such lens dial 72 may still rotate. A portion of lens dial 72 is visible next to retention clip 82. While only one retention clip 82 is visible in this drawing, it will be recognized that two or more retention clips 82 may be employed. In some instances, there will be two or more retention clips 82. Three, four or more retention clips 82 may also be used. In some cases, retention clips 82 may be equally spaced, but this is not necessary.

In FIGS. 3 and 4, back 50 of upper housing 46 includes a center 84. In some instances, as illustrated, center 84 may include an annular ring 86 about which annular portion 40 of set point operator 34 (FIG. 1) may pivot. As seen in FIG. 4, annular portion 40 may fit over annular ring 86. In some instances, annular portion 40 is sized and configured such that while it may still be allowed to rotate on annular ring 86, it will hold itself onto annular ring 86. This may provide a manufacturing advantage.

In FIG. 4, set point operator 34 can be seen as positioned within upper housing 46. In particular, first portion 36 is positioned with annular portion 40 about annular ring 86 of upper housing 46 while second portion 38 is positioned in contact with engagement portion 80 of lens dial 72. It can be seen that by rotating textured portion 76 of lens dial 72, set point operator 34 will translate rotational movement of lens dial 72 into rotational movement of first portion 36 and hence shaft portion 42. Since shaft portion 42 extends through aperture 28 and therefore through potentiometer 30 of printed circuit board 24, it can be seen that rotation of lens dial 72 is converted into an electrical signal that may be processed and/or forwarded to the appropriate HVAC equipment.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. An HVAC controller comprising:
   an upper housing, the upper housing having a front and a back, the back including a center;
   a lens dial secured adjacent to the front of the upper housing, the lens dial being rotatable relative to the upper housing about a rotation axis, the lens dial having an engagement portion that is spaced laterally from the rotation axis of the lens dial, and extends through an opening in the upper housing toward the back of the upper housing, wherein when the lens dial is secured adjacent to the upper housing, at least part of the upper housing is situated between the rotation axis of the lens dial and the engagement portion;

a set point operator including a first portion that is rotatable about the rotation axis of the lens dial and a second portion that extends over toward and engages the engagement portion of the lens dial such that rotation of the lens dial results in movement of the engagement portion along an arc, causing the second portion of the set point operator to move along an arc and to rotate the first portion of the set point operator about the axis of rotation of the lens dial; and a mechanical movement to electrical signal converter disposed within the HVAC controller such that the first portion of the set point operator communicates with the mechanical movement to electrical signal converter.

2. The HVAC controller of claim 1, wherein the upper housing comprises one or more retention clips that rotatably secure the lens dial to the upper housing.

3. The HVAC controller of claim 2, wherein one or more retention clips interact with a lens dial periphery.

4. The HVAC controller of claim 1, wherein the first portion of the set point operator includes an annular portion adapted to fit about the upper housing center and a shaft portion adapted to interact with the mechanical movement to electrical signal converter.

5. The HVAC controller of claim 4, wherein the upper housing center includes an annular ring about which the annular portion of the set point operator rotates.

6. The HVAC controller of claim 1, wherein the lens dial includes a set point indicator disposed on the lens dial.

7. The HVAC controller of claim 6, wherein the lens dial and the set point indicator are integrally molded.

8. The HVAC controller of claim 1, further comprising a scale plate disposed between the upper housing and the lens dial.

9. The HVAC controller of claim 8, wherein the scale plate is secured to the upper housing.

10. The HVAC controller of claim 8, wherein the scale plate comprises aluminum.

11. The HVAC controller of claim 8, further comprising a thermometer including a current temperature indicator.

12. The HVAC controller of claim 11, wherein the scale plate comprises a set point temperature scale, a current temperature scale and a center portion configured to permit the current temperature indicator to extend over the current temperature scale.

13. The HVAC controller of claim 12, wherein the upper housing includes a raised portion to accommodate the thermometer thereunder.

14. A thermostat comprising:

a housing;

a lens dial rotatably secured to the housing, the lens dial having a periphery and rotating about a rotation axis;

a circuit board adapted to control HVAC equipment, the circuit board including a mechanical movement to electrical signal converter positioned along the rotation axis of the lens dial; and a mechanical linkage configured to convert movement at or near the lens dial periphery into movement at the mechanical movement to electrical signal converter, the mechanical linkage comprising a set point operator having a first end configured to interact with an engagement member extending from at or near the lens dial periphery and a second, opposing, end configured to interact with the mechanical movement to electrical signal converter.

15. The thermostat of claim 14, wherein the lens dial is snap fitted onto the housing.

16. The thermostat of claim 14, wherein the lens dial includes a set point indicator disposed on the lens dial.

17. The thermostat of claim 16, wherein the lens dial and the set point indicator are integrally molded.

18. The thermostat of claim 14, further comprising a scale plate secured to the housing and disposed under the lens dial.

19. The thermostat of claim 18, further comprising a thermometer including a current temperature indicator.

20. The thermostat of claim 19, wherein the scale plate comprises a set point temperature scale, a current temperature scale and a center portion configured to permit the current temperature indicator to extend onto the current temperature scale.

21. The thermostat of claim 20, wherein the housing includes a raised portion to accommodate the thermometer thereunder.

* * * * *